United States Patent [19]

Schneider et al.

[11] Patent Number: 4,929,952
[45] Date of Patent: May 29, 1990

[54] SEARCH-RADAR AZIMUTH CORRECTION

[75] Inventors: Alan M. Schneider, La Jolla; Donald W. Doherty, San Diego, both of Calif.

[73] Assignee: The United States of America as represented by the Secretary of the Navy, Washington, D.C.

[21] Appl. No.: 420,623

[22] Filed: Oct. 10, 1989

Related U.S. Application Data

[63] Continuation of Ser. No. 619,248, Jun. 11, 1984, abandoned.

[51] Int. Cl.$^5$ .............................................. H01Q 3/02
[52] U.S. Cl. ...................................... 342/184; 367/12
[58] Field of Search .................. 367/12; 342/184, 451, 342/77, 370; 364/516, 517, 571.01

[56] References Cited

U.S. PATENT DOCUMENTS

| | | | |
|---|---|---|---|
| 3,315,256 | 4/1967 | Lind | 342/184 X |
| 3,453,619 | 7/1969 | Wright | 343/8 |
| 3,665,168 | 5/1972 | Canfield | 235/150.2 |
| 3,683,373 | 8/1972 | Barnes | 342/184 X |
| 3,757,093 | 9/1973 | Licata | 235/150.1 |
| 3,790,766 | 2/1974 | Brown | 235/150.25 |
| 3,797,014 | 3/1974 | Tompkins | 342/184 X |
| 3,798,425 | 3/1974 | Heard | 342/184 X |
| 3,824,386 | 7/1974 | Offereins | 235/150.27 |
| 3,847,348 | 11/1974 | Russ | 235/151.3 |
| 3,928,754 | 12/1975 | Edlund | 235/150.2 |
| 4,148,026 | 4/1979 | Gendreu | 343/5 ST |
| 4,166,406 | 9/1979 | Maughmer | 89/1.815 |
| 4,224,507 | 9/1980 | Gendreu | 343/5 ST |

Primary Examiner—Thomas H. Tarcza
Assistant Examiner—Tod Swann
Attorney, Agent, or Firm—Harvey Fendelman; Thomas Glenn Keough

[57] ABSTRACT

A system for generating a corrected azimuth signal for a radar system having a radar antenna and a radar display where the radar antenna is mounted on a craft that is subject to motion and that has a stable reference source. A digital computer is connected to the stable reference source of the craft for receiving signals representative of the craft's roll, $\phi$, and representative of the craft's pitch, $\theta$. The digital computer processes the signals representative of roll and pitch utilizing a correction algorithm in order to generate an azimuth correction signal. This azimuth correction signal is combined with the radar azimuth signal by means of the craft's solid state control differential transmitter. The output of the solid state control differential transmitter constitutes a corrected azimuth signal and is furnished to the display of the radar system. The display thus generated by the radar system pursuant to target detection thus accurately represents the true azimuth of the target.

8 Claims, 4 Drawing Sheets

SEARCH-RADAR AZIMUTH CORRECTION

STATEMENT OF GOVERNMENT INTEREST

The invention described herein may be manufactured and used by or for the Government of the U.S. of America for governmental purposes without the payment of any royalties thereon or therefor.

This is a continuation of application Ser. No. 619,248, filed 11 June 1984 now abandoned.

BACKGROUND OF THE INVENTION

The present invention relates generally to the field of radar systems and, more particularly, to radar systems which are mounted on non-stable platforms such as those installed on ships, aircraft or land vehicles such as tanks. Current two-dimensional search radar systems installed on such craft and vehicles suffer from azimuth errors and PPI (plan position indicator) display ambiguities whenever the craft on which the radar system is installed rolls or pitches.

Ship's heading as used herein means the instantaneous direction of the ship's longitudinal axis in the horizontal plane when pitch and roll are both zero. The heading, together with the vertical axis through the mass-center of the ship, and the third axis that is mutually perpendicular to these two, form the reference frame in which the pitch and roll angles are defined. The true bearing (azimuth) is defined as the clockwise angle in the horizontal plane, relative to the ship's heading, of the vertical plane containing the line-of-sight to the target. The radar azimuth signal $\alpha$ is the clockwise instantaneous angle in the deck plane of the ship from the ship's forward longitudinal axis to the slant plane perpendicular to the deck plane which contains the line-of-sight to the target.

The pitch angle, $\theta$, is the angle of rotation, with regard to a ship, resulting when the forward end of the ship rises about the axis of the deck plane of the ship, perpendicular to the longitudinal axis. The roll angle, $\phi$, of a ship, for instance, is the angle of rotation of the ship about the longidutinal axis of the deck plane of the ship. $\theta$ is defined to be positive when the forward end of the ship rises about the axis of the deck plane and $\phi$ is defined to be positive when the starboard side of the ship tilts down about the longitudinal axis of the deck plane.

Whenever such pitch or roll occurs, the radar system installed on the vehicle or craft suffers from the aforementioned azimuth error and PPI ambiguity. Thus, the angle output of the radar of the system, at the time its beam illuminates a target, is not necessarily equal to the true azimuth of the target in the horizontal plane. Consequently, one stationary surface target can cause a sequence of disconnected blips on a PPI display as the ship rolls, on successive sweeps of a target by the rotating beam of the radar system.

A further error may occur if the target is an airborne target. Many search radars in the navy do not measure the elevation of the target. They simply sweep a beam which has a wide fan shape in a general up-down direction and, if this beam illuminates a target at any elevation whatsoever, a blip is recorded on the PPI display. The errors associated with the azimuth of airborne targets are typically larger than those associated with surface targets. There are hundreds of radar systems in use in the navy at this time having the aforementioned limitations.

SUMMARY OF THE INVENTION

The aforementioned problems are overcome by the present invention which accomplishes correction of the azimuth output of a search radar that is installed on a craft or vehicle that is subject to pitch and/or roll motion. The present invention also reduces or eliminates multiple-target appearance of a single target on a PPI display due to the azimuth error and reduces the acquisition time for a more direct radar which may be used to lock onto a target following detection of a target by the search radar. The present invention also reduces the tendency towards human operator error resulting from the PPI display ambiguity.

The foregoing is accomplished in the present invention by connecting the output of the stable reference source of the vehicle or craft to a digital computer. The output from the stable reference source typically includes output signals representative of the pitch, $\theta$, and roll $\phi$, of the craft or vehicle. The digital computer also receives an input from the output of the search radar that constitutes the radar azimuth signal. The digital computer is programmed to determine what sector the detected target is in and, utilizing the sector information, performs one of four compensation algorithms utilizing $\theta$ and $\phi$ as variables. The output of the computer is an azimuth correction signal, $C_\alpha \cdot C_\alpha$ *is combined with the radar azimuth signal, $\alpha$, to generate a corrected radar azimuth signal, Az. The corrected radar azimuth signal, Az, is supplied to the PPI display which uses it to accurately display the correct bearing of the target with regard to the heading of the craft or vehicle.*

OBJECTS OF THE INVENTION

Accordingly, it is the primary object of the present invention to disclose a system for correcting ambiguities arising in the azimuth output of a search radar caused by roll or pitch of the vehicle or craft on which the radar system is installed.

It is a further object of the present invention to disclose a system for generating a corrected azimuth signal for input to a PPI display in a search radar system.

It is a still further object of the present invention to provide a system for reducing or eliminating multiple-target appearance of a single target on a PPI display due to azimuth error.

It is a concomitant object of the present invention to disclose a system for reducing the acquisition time of a more direct radar system such as a tracking radar system which locks onto a target that has been detected by the search radar.

These and other objects of the invention will become more readily apparent from the ensuing specification when taken together with the drawings.

DESCRIPTION OF THE PREFERRED EMBODIMENT

Figure 1:
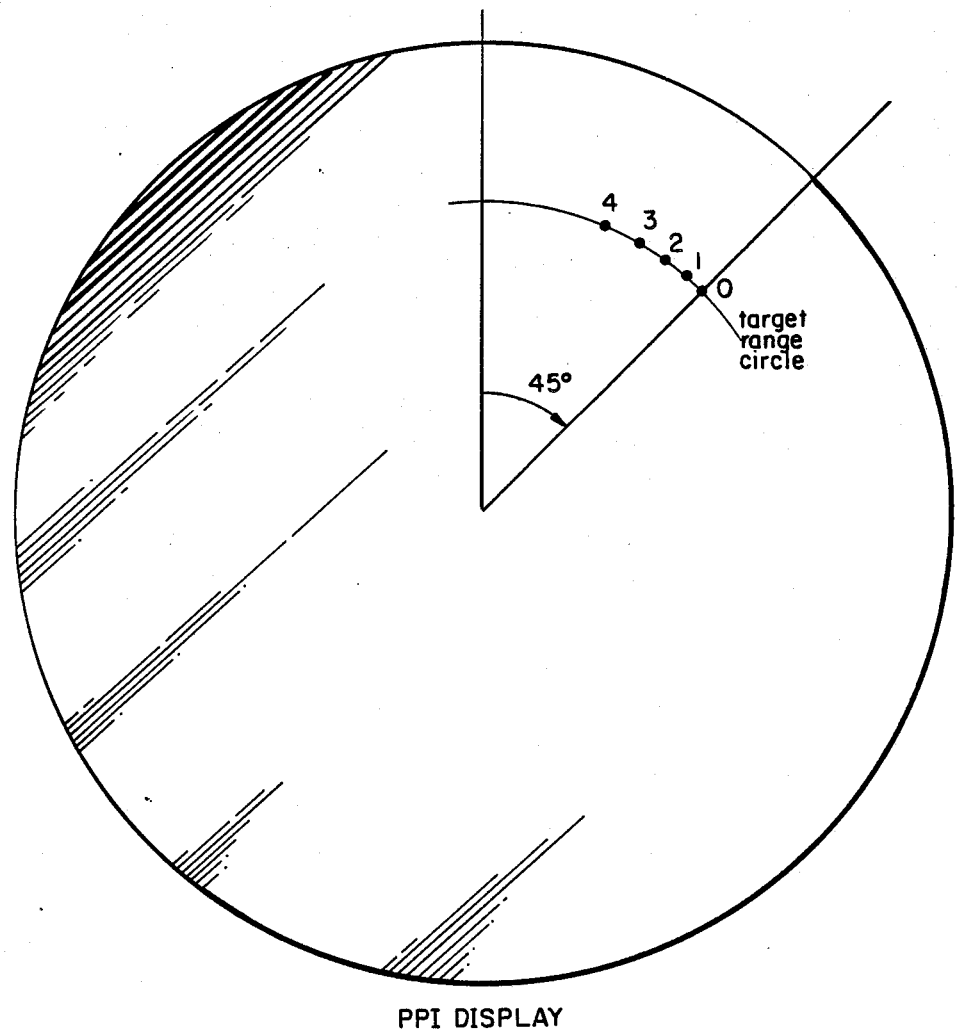
FIG. 1 is a graphic representation of the PPI ambiguity introduced by roll motion of a ship.
Figure 2:
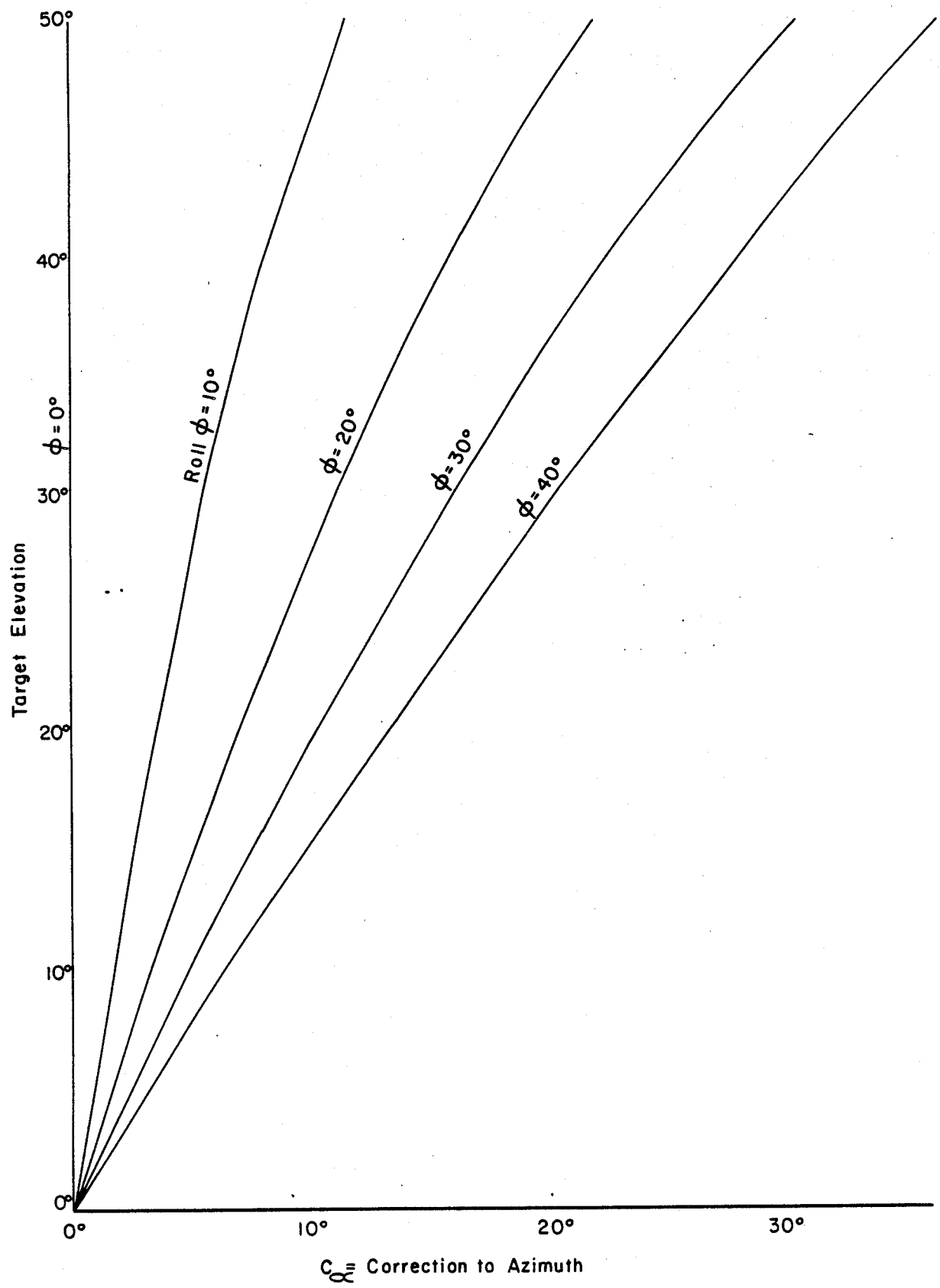
FIG. 2 is a graphic representation of the corrections to azimuth that are required for various roll angles and target elevations for the situation where the ship's pitch and the bearing of the target relative to the ship's heading are both zero.
Figure 3:
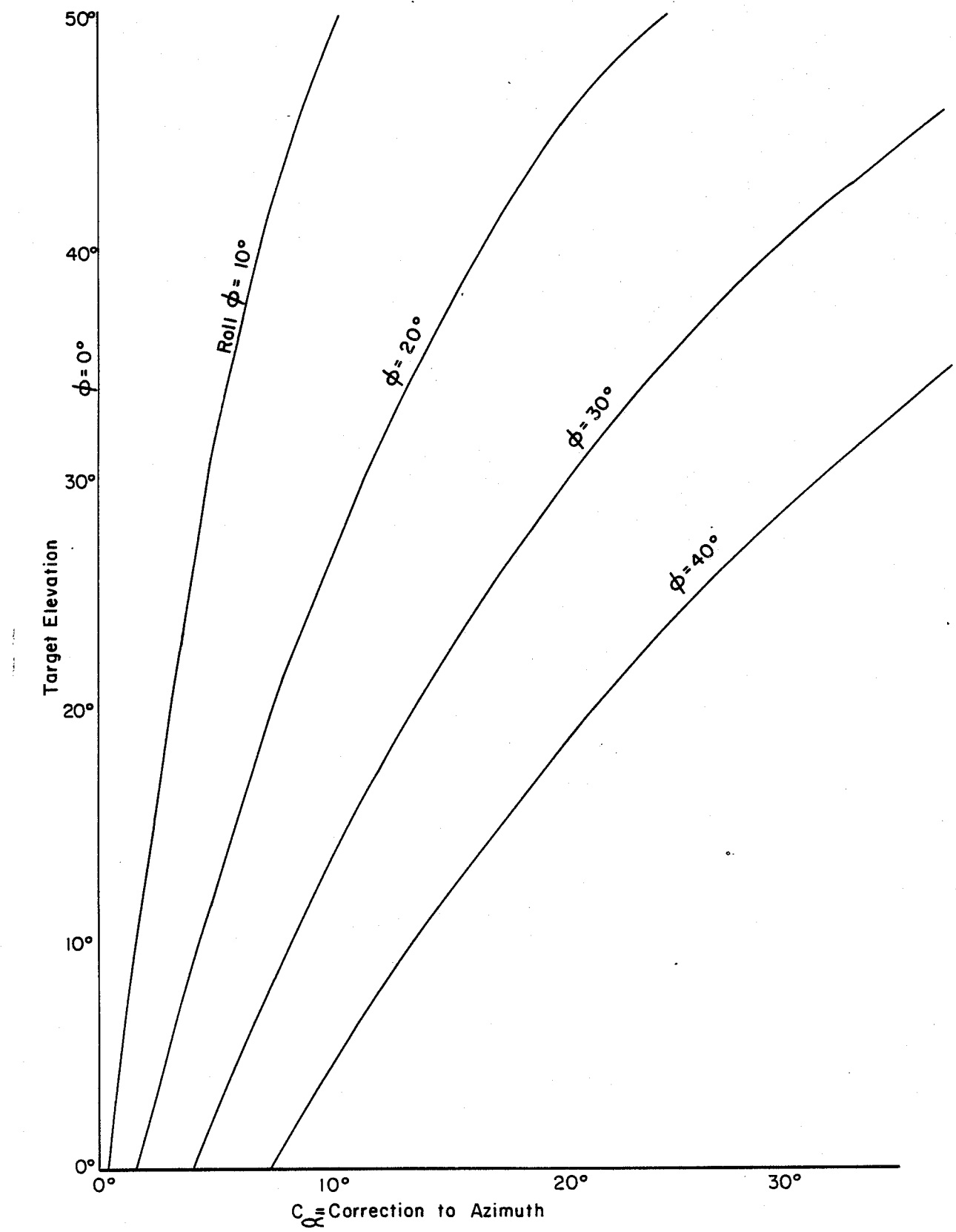
FIG. 3 is a graphic representation of the corrections required to the azimuth signal for various roll angles and target elevations for the situation where pitch is zero and the bearing of the target relative to the ship is 45°.

In order to facilitate an understanding of the present invention reference is made to FIGS. 1 through 3. In FIG. 1 there is illustrated a PPI-scope display, by way of example, which is installed upon a water craft. The positions, 0, 1, 2, 3 and 4 show the location of the PPI blip representing a target detected by the radar on the watercraft when the roll angle of the craft is 0°, 10°, 20°, 30° and 40°, respectively. The PPI display illustrated in FIG. 1 shows, by way of example, that when the true bearing of the target relative to the craft is 45° and the pitch of the ship is 0° and the target elevation is 20°, a change in the roll angle of the ship can drastically affect the position of the PPI blip representing the target on the scope.

Similarly, FIG. 2 illustrates in graphic form the correction to the azimuth signal that is required for various roll angles of the craft and target elevation. In the example illustrated in FIG. 2, the heading, bearing, and pitch are all zero. FIG. 2 illustrates that as target elevation increases and as the roll angle of the craft increases, a greater correction to the azimuth signal is required. Likewise, FIG. 3 illustrates various corrections required to be made to the azimuth signal for the situation where pitch and heading are zero and the bearing of the target relative to the ship is 45°.

The ambiguities occurring on the PPI display of the radar system of a craft are eliminated or minimized by the present invention which will now be described with reference to FIG. 4. At the heart of the present invention is computer 12 which may comprise a digital minicomputer, a digital microprocessor or any other suitable digital computer. The computer 12 is connected in the present invention to three input channels. The first and second inputs to computer 12 are derived from a stable reference source 14 such as, for example, a ship's stable reference which may be the output of the ship's gyrocompass, inertial navigation system or the like. For instance, the Navy's Mark 19 gyrocompass which senses pitch, roll and heading may be utilized. The output of the stable reference source 14 then includes a first signal $\theta$ which represents the instantaneous pitch of the craft or vehicle. The second output of the stable reference 14 is a signal $\phi$ representative of the instantaneous roll of the ship or craft on which the radar system is installed. If the inertial reference system 14 does not have a digital output, S/D (syncro-to-digital) converters 16 and 18 may be utilized at the input of computer 12.

Figure 4:
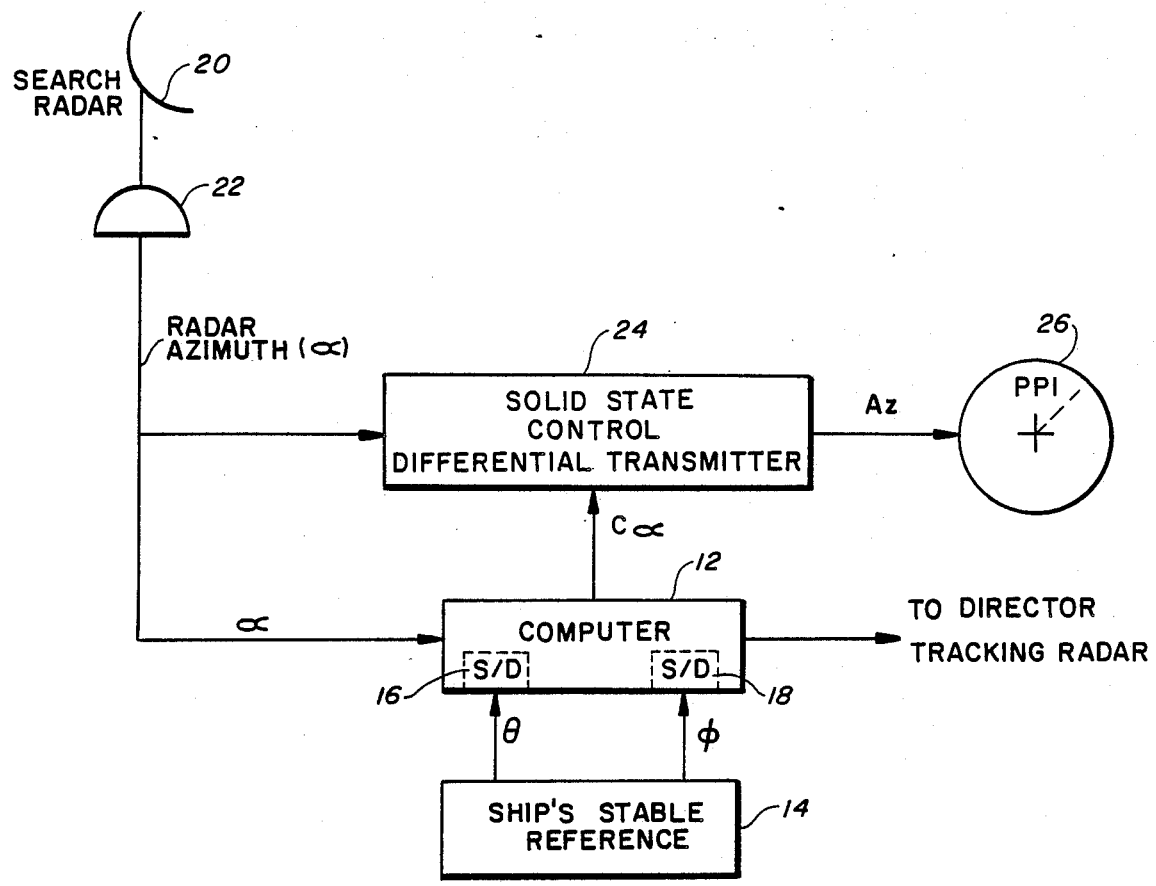
FIG. 4 is a schematic block diagram of the present invention incorporated into a search radar system.

Antenna 20 illustrated in FIG. 4 represents the search radar antenna of the radar system with which the present invention is utilized. Radar antenna 20 is mounted on an antenna base 22 pictorially represented in FIG. 4. The output signal from radar antenna 20 is thus a radar azimuth signal denoted as $\alpha$. The radar's azimuth signal $\alpha$ is furnished as the third input to computer 12 and is also simultaneously furnished to the solid state control differential transmitter 24. Solid state control differential transmitter 24 also receives an input that is the output of computer 12 and that comprises a signal, $C_\alpha$, representing the amount by which the radar azimuth's signal is to be corrected as the result of attitude of the vehicle or craft. Solid state differential control transmitter combines the signals $\alpha$ and $C_\alpha$. The output of the solid state control differential transmitter 24 is a corrected azimuth signal, Az, and is furnished as the input signal to the radar polar coordinate PPI screen 26. It is noted that without the present invention, the radar azimuth's signal $\alpha$ would be transmitted via the solid state control differential transmitter 24 directly to the PPI display 26, without correction. That signal would then have been representative of the position of the radar scan antenna with regard to ship's heading. It is also noted at this point that although the preferred embodiment of the present invention is described with regard to implementation onboard a ship, the present invention may obviously be utilized with other forms of radar-bearing craft or vehicles such as tanks and aircraft.

The computer 12 is programmed as follows in order to derive the correction signal, $C_\alpha$. First, the computer is programmed to determine what sector the target is detected in with respect to the ship's heading. There are four sectors I, II, III and IV within which a target may fall. Sector I is defined as the sector where $-45° \leq \alpha \leq +45°$. Sector II is defined as the sector where $135° \leq \alpha \leq 225°$. Sector III is defined as the sector where $45° < \alpha < 135°$. Sector IV is defined as the sector where $225° < \alpha < 315°$.

If the target is detected in Sector I, computer 12 is programmed to compute A where $$A = \tan^{-1}\left[\frac{(a_{21}a_{33} - a_{23}a_{31}) + (a_{22}a_{33} - a_{23}a_{32})\tan\alpha}{(a_{11}a_{33} - a_{13}a_{31}) + (a_{12}a_{33} - a_{13}a_{32})\tan\alpha}\right]. \quad 1.$$

If the target is detected in Sector II, computer 12 is programmed to calculate A where $$A = \tan^{-1}\left[\frac{-[(a_{21}a_{33} - a_{23}a_{31}) + (a_{22}a_{33} - a_{23}a_{32})\tan\alpha]}{-[(a_{11}a_{33} - a_{13}a_{31}) + (a_{12}a_{33} - a_{13}a_{32})\tan\alpha]}\right]. \quad 2.$$

If the target is detected in Sector III, the computer 12 is programmed to computer A where $$A = \tan^{-1}\left[\frac{(a_{22}a_{33} - a_{23}a_{32}) + (a_{21}a_{33} - a_{23}a_{31})\operatorname{ctn}\alpha}{(a_{12}a_{33} - a_{13}a_{32}) + (a_{11}a_{33} - a_{13}a_{31})\operatorname{ctn}\alpha}\right]. \quad 3.$$

If the target is detected in Sector IV the computer is programmed to compute the quantity A where $$A = \tan^{-1}\left[\frac{-[(a_{22}a_{33} - a_{23}a_{32}) + (a_{21}a_{33} - a_{23}a_{31})\operatorname{ctn}\alpha]}{-[(a_{12}a_{33} - a_{13}a_{32}) + (a_{11}a_{33} - a_{13}a_{31})\operatorname{ctn}\alpha]}\right]. \quad 4.$$

In all cases, the arctangent ($\tan^{-1}$) may be computed from a four-quadrant subroutine. In such a subroutine, the quadrant of A is customarily and uniquely determined by the sign of the numerator (N) and denominator (D) of the argument of the arctangent, as follows:

$$\tan^{-1}\frac{N}{D} \text{ is in quadrant I if} \begin{cases} N \geq 0 \\ D > 0 \end{cases}$$

$$\tan^{-1}\frac{N}{D} \text{ is in quadrant II if} \begin{cases} N \geq 0 \\ D < 0 \end{cases}$$

-continued $\tan^{-1}\frac{N}{D}$ is in quadrant III if $\begin{pmatrix} N < 0 \\ D < 0 \end{pmatrix}$ $\tan^{-1}\frac{N}{D}$ is in quadrant IV if $\begin{pmatrix} N < 0 \\ D > 0 \end{pmatrix}$ if $D = 0$, $\begin{cases} \text{then } A = 90° \text{ if } N > 0 \\ \text{or } A = 270° \text{ if } N < 0 \end{cases}$ For all Sectors, the computer is programmed such that
$a_{11} = \cos\theta$
$a_{12} = \sin\theta \sin\phi$
$a_{13} = \sin\theta \cos\phi$
$a_{21} = 0$
$a_{22} = \cos\phi$
$a_{23} = -\sin\phi$
$a_{31} = -\sin\theta$
$a_{32} = \cos\theta \sin\phi$
$a_{33} = \cos\theta \cos\phi$.

In other words, $C_\alpha$ is the correction angle which must be added to the antenna radar azimuth angle, $\alpha$, to the target to obtain the true value of the azimuth of the target in the horizontal plane relative to the projection of the ship's fore and aft, i.e. longitudinal axis in the horizontal plane.

Finally, the computer is programmed to perform the computation of $C_\alpha$ where $$C_\alpha = A - \alpha.$$

$C_\alpha$ is therefore the output of computer 12 that is furnished as the input to solid state control differential transmitter 24.

As a specific example, assume that the radar antenna 20 is rotating around a fixed axis with respect to the deck plane of a ship. Assuming also that the ship has zero roll and pitch, then this axis is parallel essentially to the true vertical and the antenna beam rotates around the axis as it sweeps out its search pattern. The radar output will tell how far the antenna is rotated with respect to the ship's heading in degrees or radians or the equivalent. Assume now that the ship has rolled and pitched by some unknown amount. In this situation, the fixed axis around which the radar antenna rotates is no longer perpendicular to true horizontal and is therefore no longer a true vertical axis. As is indicated in FIGS. 1 through 3, this, without the present invention would result in an ambiguity on the PPI display 26. By utilization of the present invention, the output of the ship's stable reference 14 furnishes the signals $\theta$ and $\phi$ to the computer 12, the signals $\theta$ and $\phi$ being representative of the amount by which the ship has pitched and rolled in the present example. The computer 12 receives this pitch and roll information and, after having determined what sector the target is in as described above, performs the computation of the appropriate quantity A as is indicated above. The output of computer 12 is then a correction-to-azimuth signal $C_\alpha$. This correction-to-azimuth signal, $C_\alpha$ is combined by the solid state control differential transmitter 24 with the azimuth signal $\alpha$ to result in the corrected azimuth signal Az. The corrected azimuth signal Az is furnished to the PPI display 26 where the true position of the target with regard to ship's heading is displayed. The output of the computer 12 may also be furnished to a director tracking radar which may then lock onto the target.

Obviously, many modifications and variations of the present invention are possible in the light of the above teachings. It is therefore to be understood that within the scope of the appended claims the invention may be practiced otherwise than as specifically described.

What is claimed is:

1. In a radar system having a radar antenna mounted on a non-stable platform and a radar polar coordinate plan position indicator display, said radar antenna mounted on a non-stable platform being mounted on a craft or vehicle that is subject to motion and that has a stable reference source that is stable in attitude, the improvement comprising a correction system for generating a correction-to-azimuth signal, $C\alpha$, said correction system comprising:
   a computer having a first input connected to said stable reference source, having a second input connected to said radar antenna, and having at least a first output;
   means having a first input connected to said antenna and a second input connected to said first computer output for generating an output signal that comprises said correction-to-azimuth signal, $C\alpha$, said means having an output that is connected to said radar display; and further wherein:
   said radar antenna is not mounted on a platform that moves independently with respect to the motion of said craft or vehicle and wherein said non-stable platform does not move independently with respect to the motion of said craft or vehicle; and
   wherein said correction-to-azimuth signal, $C_\alpha$, is the correction angle which must be added to the antenna radar azimuth angle, $\alpha$, to obtain the true value of the azimuth of the target in the horizontal plane relative to the projection of the longitudinal axis of said craft or vehicle in the horizontal plane.

2. The system of claim 1 wherein:
   said stable reference source provides a first output that is proportional to the deviation in pitch, $\theta$, of said craft from a reference pitch position, and a second output that is proportional to the deviation in roll, $\phi$, of said craft from a reference roll position;
   said computer being connected to receive said first and second outputs of said stable reference source.

3. The system of claim 2 wherein said computer receives a target azimuth signal, $\alpha$, from said radar antenna.

4. The system of claim 3 wherein:
   said means for generating an output signal comprises a solid state control differential transmitter.

5. The system of claim 4 wherein said output signal of said solid state control differential transmitter comprises the sum of $C\alpha$ and $\alpha$.

6. The system of claim 3 wherein said means for generating an output signal that is comprised of the sum of $C\alpha$ and $\alpha$.

7. In a radar system having a radar antenna mounted on a non-stable platform and a radar polar coordinate display, said radar antenna mounted on a non-stable platform being mounted on a craft or vehicle that is subject to motion and that has a stable reference source that is stable in attitude, the improvement comprising a correction system for generating a correction-to-azimuth signal, $C\alpha$, said correction system comprising:
   a computer having a first input connected to said stable reference source, having a second input connected to said radar antenna and having at least a first output;

means having a first input connected to said antenna and a second input connected to said first computer output for generating an output signal that comprises said correction-to-azimuth signal, $C_\alpha$, said means having an output that is connected to said radar display; and further wherein:

said radar antenna is not mounted on a platform that moves independently with resepct to the motion of said craft or vehicle and wherein said non-stable platform does not move independently with respect to the motion of said craft or vehicle, and wherein $C_{60}$ corresponds to the correction angle which must be added to the antenna radar azimuth angle to a target, $\alpha$, to obtain the true value of the azimuth of the target in the horizontal plane relative to the projection of the ship's fore and aft longitudinal axis in the horizontal plane; and wherein said stable reference source provides a first output that is proportional to the deviation in pitch, $\theta$, of said craft from a reference position, and a second output that is proportional to the deviation in roll, $\phi$, of said craft from a reference roll position;

said computer being connected to receive said first and second outputs of said stable reference source and receives a target azimuth signal corresponding to $\alpha$ from said radar antenna mounted on a non-stable platform; and where:

$C_\alpha = A - \alpha$; and where $$A = \tan^{-1}\left[\frac{(a_{21}a_{33} - a_{23}a_{31}) + (a_{22}a_{33} - a_{23}a_{32})\tan\alpha}{(a_{11}a_{33} - a_{13}a_{31}) + (a_{12}a_{33} - a_{13}a_{32})\tan\alpha}\right]$$

where $-45° \leq \alpha \leq 45°$ from a predetermined reference position;

$$A = \tan^{-1}\left[\frac{-[(a_{21}a_{33} - a_{23}a_{31}) + (a_{22}a_{33} - a_{23}a_{32})\tan\alpha]}{-[(a_{11}a_{33} - a_{13}a_{31}) + (a_{12}a_{33} - a_{13}a_{32})\tan\alpha]}\right]$$

where $135° \leq \alpha \leq 225°$ from said predetermined reference position;

$$A = \tan^{-1}\left[\frac{(a_{22}a_{33} - a_{23}a_{32}) + (a_{21}a_{33} - a_{23}a_{31})\text{ctn}\alpha}{(a_{12}a_{33} - a_{13}a_{32}) + (a_{11}a_{33} - a_{13}a_{31})\text{ctn}\alpha}\right]$$

where $45° < \alpha < 135°$ from said predetermined reference position; and $$A = \tan^{-1}\left[\frac{-[(a_{22}a_{33} - a_{23}a_{32}) + (a_{21}a_{33} - a_{23}a_{31})\text{ctn}\alpha]}{-[(a_{12}a_{33} - a_{13}a_{32}) + (a_{11}a_{33} - a_{13}a_{31})\text{ctn}\alpha]}\right]$$

where $225° < \alpha < 315°$ from said predetermined reference position; where $a_{11} = \cos\theta$
$a_{12} = \sin\theta \sin\phi$
$a_{13} = \sin\theta \cos\phi$
$a_{21} = 0$
$a_{22} = \cos\phi$
$a_{23} = -\sin\phi$
$a_{31} = -\sin\theta$
$a_{32} = \cos\theta \sin\phi$
$a_{33} = \cos\theta \cos\phi$ 8. The system of claim 7 wherein:
said means for generating an output signal comprises a solid state control differential transmitter.

* * * * *